United States Patent [19]

Melanson et al.

[11] Patent Number: 5,395,522
[45] Date of Patent: Mar. 7, 1995

[54] APPARATUS FOR REMOVAL OF ORGANIC MATERIAL FROM WATER

[75] Inventors: Paul C. Melanson; James A. Valdez, both of Boulder, Colo.

[73] Assignee: Anatel Corporation, Boulder, Colo.

[21] Appl. No.: 21,040

[22] Filed: Feb. 23, 1993

[51] Int. Cl.$^6$ .............................................. C02F 9/00
[52] U.S. Cl. .................................... 210/202; 204/149; 204/157.15; 204/193; 204/275; 210/243; 210/259; 210/266
[58] Field of Search .................... 204/157.15, 193, 149, 204/275; 210/748, 763, 202, 243, 259, 266; 422/186, 186.3

[56] References Cited

U.S. PATENT DOCUMENTS

| | | | |
|---|---|---|---|
| 4,861,484 | 8/1989 | Lichtin et al. | 210/638 |
| 4,863,608 | 9/1989 | Kawai et al. | 210/763 |
| 4,868,127 | 9/1989 | Blades et al. | 436/146 |
| 4,888,101 | 12/1989 | Cooper | 204/157.15 |
| 4,892,712 | 1/1990 | Robertson et al. | 422/186 |
| 5,047,212 | 9/1991 | Blades et al. | 422/82.02 |
| 5,116,582 | 5/1992 | Cooper | 422/186.3 |
| 5,118,422 | 6/1992 | Cooper et al. | 210/636 |
| 5,126,111 | 6/1992 | Al-Ekabi et al. | 210/748 |
| 5,174,877 | 12/1992 | Cooper et al. | 204/193 |
| 5,302,356 | 4/1994 | Shadman et al. | 422/186.3 |

FOREIGN PATENT DOCUMENTS 0234875 2/1987 European Pat. Off. .

OTHER PUBLICATIONS

"Photoelectrochemistry and Heterogeneous Photocatalysis at Semiconductors", Bard, J. Photochemistry 10, 59–75 (1979).

"The Present Status and Trends of Photocatalytic Reactions", Arakawa, TechnoJapan 18, No. 11, 10–22 (1985).

"Organic Heterogeneous Photocatalysis: Chemical Conversion Sensitized by Irradiated Semiconductors", Fox, Acc. Chem. Res. 16, 314–321 (1983).

"Sun-Powered Pollution Clean Up", Pool, Science, vol. 245, 130 (Jul. 1989).

Primary Examiner—Ivars Cintins
Attorney, Agent, or Firm—Michael M. de Angeli

[57] ABSTRACT

An apparatus for removal of organic materials from water includes a reactor for photocatalytic oxidation and/or ionization of organics in the water stream and an ion exchange column for removal of $CO_2$, dissolved acids, and ionized organics formed in the reactor from the water stream. The reactor includes an elongated flow chamber having an inlet at one end and an outlet at the opposite end. A photocatalytic material is provided as a surface layer on a number of solid members in the chamber, typically a number of rods extending generally parallel to the axis of the flow chamber. The catalyst may be $TiO_2$ formed by oxidizing the surface of Ti rods. An elongated UV lamp fitting within a tubular quartz window extends along the axis of the reaction chamber. An external circuit connects the electrodes and the water, such that a current flows in the water in the reaction chamber. A potential of up to 600 VDC may be applied between the solid electrodes and water in the chamber.

27 Claims, 3 Drawing Sheets

FIG. 1

APPARATUS FOR REMOVAL OF ORGANIC MATERIAL FROM WATER

BACKGROUND OF THE INVENTION

1. Field of the Invention

This invention relates to removal of organic materials from water streams. More particularly, this invention relates to a reactor for efficient oxidation or ionization of various organic materials commonly present in water streams, to be used in combination with apparatus for removal of the ionized organic materials, and to an accompanying method for oxidation, ionization, and removal of such organic materials.

2. Description of the Prior Art

For many years, there has been substantial interest in removal of organic materials from water streams. "Removal", in this context, includes destruction of organic molecules, e.g., by oxidation to form weak organic acids and carbon dioxide, as well as removal of the organics per se. This subject includes removal of bacteria and other organic wastes from various sources in effluent streams, to render the effluent potable or at least non-polluting, removal of organic solvents and other industrial chemicals from a process water stream for reuse or for discharge, and removal of organics from makeup water streams in power plants and the like, as well as destruction of organics in instruments as a step in their measurement.

More recently, traditional methods of destruction of organics in water streams, such as biological digestion, as commonly practiced by sewage treatment plants, have been supplemented by photocatalytic destruction of organics. In the latter processes, the water stream containing the organics to be destroyed is exposed to ultraviolet radiation (UV) of wavelength suitable to break up the organics, typically UV of 185 and 254 nm wavelength, in the presence of a semiconductive catalyst, commonly a $TiO_2$ layer on the surface of a solid substrate.

The theoretical basis for photocatalysis in general is discussed in Bard, "Photoelectrochemistry and Heterogeneous Photocatalysis at Semiconductors," *J. Photochemistry* 10, 59–75 (1979), in Arakawa, "The Present Status and Trends of Photocatalytic Reactions," *TechnoJapan* 18, No. 11, 10–22 (1985), and is summarized in Fox, "Organic Heterogeneous Photocatalysis: Chemical Conversion Sensitized by Irradiated Semiconductors," *Acc. Chem. Res.* 16, 314–321 (1983).

Commonly-assigned U.S. Pat. No. 4,868,127 to Blades et al (incorporated herein by this reference) discloses and claims an instrument for measurement of total organic carbon (TOC) in water, wherein a $TiO_2$ layer formed on the surfaces of solid Ti electrodes used to monitor the conductivity of a water sample catalyzes the oxidation of organics in the water sample upon exposure to UV. Blades et al suggest at col. 24 that the combination of short-wavelength UV and a photocatalyst such as $TiO_2$ may be useful in the destruction of organics in water, specifically for pollution control purposes. Blades et al suggest further at col. 25, line 34 col. 26, line 10 that application of a potential across electrodes exposed to the water, typically 150 V, is useful in speeding the reaction of the organics to form $CO_2$.

Pool, "Sun-Powered Pollution Clean Up," *Science* 245, 130 (Jul. 14, 1989), discloses an experimental-scale device in which polluted water is mixed with grains of $TiO_2$ and pumped along the bore of a glass tube at the focus of a parabolic reflector collecting the sun's rays. According to this disclosure, UV from the sun frees electrons from the $TiO_2$, creating electron "holes". The holes combine with water, dissolved oxygen, and naturally-present hydrogen peroxide to create hydroxyl radicals and peroxide ions. The latter break the organics into water, $CO_2$, and easily-neutralized dilute acids. Pool suggests that this basic approach may be useful in removing ordinary organic wastes as well as common organic solvents and the like, such as trichloroethylene. Pool does not address the problem of removal or recovery of the grains of $TiO_2$ used to catalyze the reaction.

A number of recent patent documents disclose various features of systems for photocatalytic destruction of organics in water. For example, U.S. Pat. No. 4,888,101 to Cooper discloses disposition of semiconductor powders in a fiber mesh consisting of glass wool or the like. U.S. Pat. No. 5,174,877 to Cooper et al teaches mixing such a powder with water to form a slurry and continuously stirring the slurry to maintain its consistency. U.S. Pat. No. 5,116,582 to Cooper et al discloses a photocatalytic reactor featuring a wire wrapped around a UV lamp to ensure turbulence in the water stream. A potential of several volts between the wire and the water stream is disclosed to be of value in increasing the rate of decomposition of the organics. Another Cooper et al U.S. Pat. No. 5,118,422, is directed to certain filtration steps intended to separate the semiconductor powder from the water stream and to back-flushing the filter from time to time. It is essential to remove the highly abrasive $TiO_2$ particles from the water. Particles in general are highly undesirable in a water stream, particularly in semiconductor processing.

European patent application 0 234 875 to Kawai et al discloses photocatalytic removal of trace organics from ultrapure water, e.g., as commonly used in semiconductor manufacture, and suggests that the optimum catalyst consists of "anatase" $TiO_2$ (that is, $TiO_2$ in the "octohedrite" crystal structure, rather than the more common "rutlie" form) in particulate form, with the particles optimally between about 100 m$\mu$ and 10 $\mu$ in average diameter. Addition of Pt is also taught to increase the catalytic activity. See page 14, lines 9–10.

U.S. Pat. No. 4,892,712 to Robertson et al discloses purification of water or air using a reactor comprising a length of transparent mesh coated with a photocatalytic material.

U.S. Pat. No. 4,861,484 to Lichtin et al teaches the use of a "solid catalyst comprising at least one transition element" in combination with an oxidizer, typically hydrogen peroxide, for photocatalytic decomposition of various organic substances. The "solid" catalyst appears to be prepared in particulate form and mixed with the water to be purified to form a slurry.

The inventors are also aware that a number of disclosures (not forming part of the prior art applicable to this invention, but discussed here for completeness) have been made orally, notably at a November, 1992 conference on "$TiO_2$ Photocatalytic Purification and Treatment of Water and Air" held in London, Ontario, Canada. Written Proceedings of this conference are not available as of the filing date of this application. The inventors are advised that numerous experiments involving immobilized catalysts exposed to UV to catalyze destruction of organics were discussed. Typically, a $TiO_2$ coating is formed on a fiber mesh (as in the Robertson patent), on a fixed bed, on a film, or as a membrane. $TiO_2$ films formed on Ti metal, as in the electrodes shown in the Blades et al patent, were also discussed.

OBJECTS AND SUMMARY OF THE INVENTION

It will be apparent from the above that while the art recognizes generally the utility of photocatalytic destruction of organics in water streams, specifically employing $TiO_2$ as the catalyst and 185 and 254 nm UV as the radiation, the art has not provided a suitably efficient, readily-manufacturable, cost-effective reactor for destruction of organics in water streams.

It is therefore an object of the invention to provide a reactor for photocatalytic destruction of organic material in a water stream that can be manufactured readily, in which the catalyst is efficiently exposed to both radiation and water, and wherein there is no necessity to provide the catalyst in powdered form, avoiding the numerous difficulties noted by the prior art in handling particulate catalyst material.

It is a further object of the invention to provide a reactor for oxidizing organic material in a water stream to $CO_2$ where possible, and to ionize organic materials not readily oxidizable for subsequent removal by ion exchange.

It is a further object of the invention to provide a simple and efficient method for photocatalytic ionization and/or destruction of organics in a water stream by exposure of non-particulate catalyst surfaces in the water stream to UV, followed by removal of the ionized organics.

The present invention satisfies the above and other objects of the invention appearing as the discussion herein proceeds, and overcomes the deficiencies of the prior art, by providing a reactor defining an elongated flow chamber having an inlet at one end and an outlet at the opposite end. Water flows through the chamber along a flow path controlled to ensure substantially uniformly dispersed flow and uniform residence time of the water stream within the chamber. For example, a flow diffuser may be employed to ensure uniform flow of the water through the chamber from the inlet to the outlet; in a preferred embodiment, a manifold plate divides the chamber into a plenum section in communication with the inlet, and a reactor section in communication with the outlet. The manifold plate is drilled to define a plurality of flow passages parallel to the axis of the flow chamber. The catalyst is provided as a surface layer on a number of rods extending generally parallel to the axis of the flow chamber. Typically, the catalyst is $TiO_2$ formed by oxidizing the surface of Ti rods. An elongated UV lamp fitting within a tubular quartz window extends along the axis of the reaction chamber. In a successfully-tested embodiment, the rods are arranged in concentric rings, such that a substantial portion of the surface of each is exposed to UV emitted by the lamp. A potential of up to several thousand volts DC may be applied between the rods and water in the chamber; preferably, one ring of electrodes is positive, and a second ring negative, such that a strong electric field extends radially through the water stream.

Upon exposure of organics within the chamber to the photocatalytic surfaces while irradiating the surfaces with UV, many common organics are oxidized directly to $CO_2$, which is largely present as dissolved carbonic acid in the water stream. Other organics form other weak acids, that is, other dissolved ionic species in the water stream. Still other organics are ionized upon exposure to the UV-irradiated photocatalyst. The ionized $CO_2$, other ionic species, and ionized organics are removed from the water stream by conventional ion exchange resins downstream from the reactor.

BRIEF DESCRIPTION OF THE DRAWINGS

The invention will be better understood if reference is made to the accompanying drawings, in which.

BRIEF DESCRIPTION OF THE PREFERRED EMBODIMENTS

Figure 1:
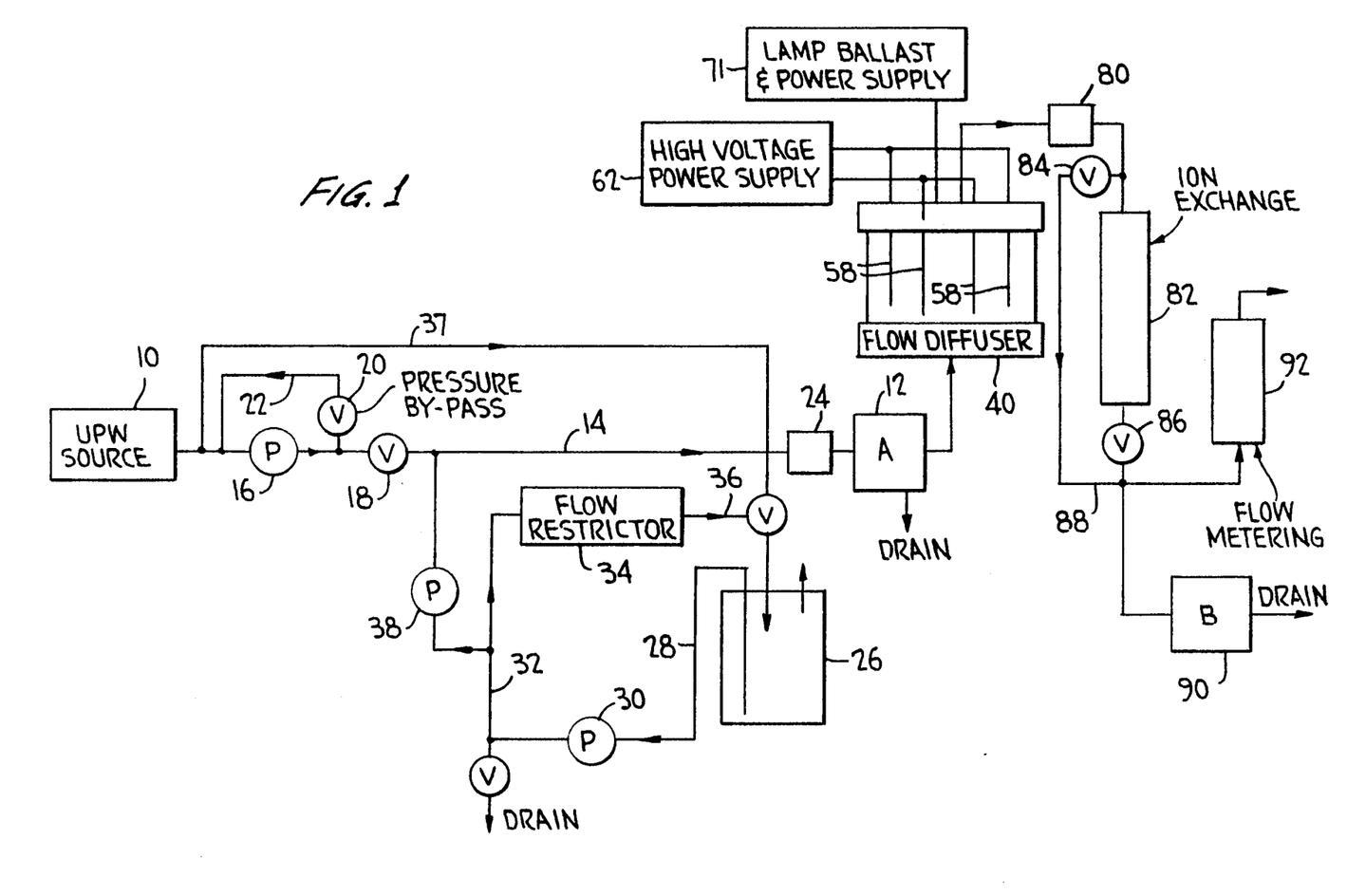
FIG. 1 is a schematic diagram of an experimental arrangement for testing the invention.

FIG. 1 shows, as mentioned, a schematic diagram of a laboratory-scale system for removing organics from a water stream according to the invention. In this system, water is purified at an approximate rate of 500 mL per minute, that is, about 30 gal/hour. Such a system would be useful in removing, for example, organic solvents from process water streams used in semiconductor manufacture, such that the water stream could be reused. Of course the system of FIG. 1 could be scaled up as necessary to provide desired total purification capacity. The system of FIG. 1 also includes instrumentation for evaluating the performance of the invention, much of which would typically be eliminated in a commercial installation.

The laboratory-scale system shown in FIG. 1 thus includes an ultrapure water (UPW) supply 10. UPW supply 10 in the system tested comprised standard Millipore Corp. components supplying 500 mL/min of water of $2.8+/-0.2$ ppb TOC, as measured by a first Anatel Corporation Model A-100 SE instrument 12 at point A in FIG. 1. The A-100 instrument 12 is commercially available from the assignee of the present application, and is as described in U.S. Pat. No. 5,047,212 to Blades et al (incorporated herein by this reference) and other commonly assigned patents. Water from UPW source 10 was supplied to point A via line 14. Pressure was supplied by pump 16 under control of valve 18. In accordance with good engineering practice, a pressure relief valve 20 and return line 22 were provided. A further resistivity meter 24 was provided to confirm the resistivity values measured by instrument 12.

For test purposes, it was desired to add a known organic contaminant in known proportion to the UPW stream. Accordingly, a solution of methanol ($CH_3OH$) in water at a concentration of 5 ppm was prepared and stored in a vessel 26. A solution loop including line 28, pump 30, line 32, flow restrictor 34 and return line 36 was established, in which the methanol solution circulated. Line 37 allows flushing of vessel 26 with UPW as needed. When it was desired to inject methanol into the UPW stream, a metering pump 38 (FMI, Inc. Model QVI-SAN) was energized, adding methanol solution to the UPW stream at a precisely controllable concentration; 100 ppb was typical.

Figures 2, 3:
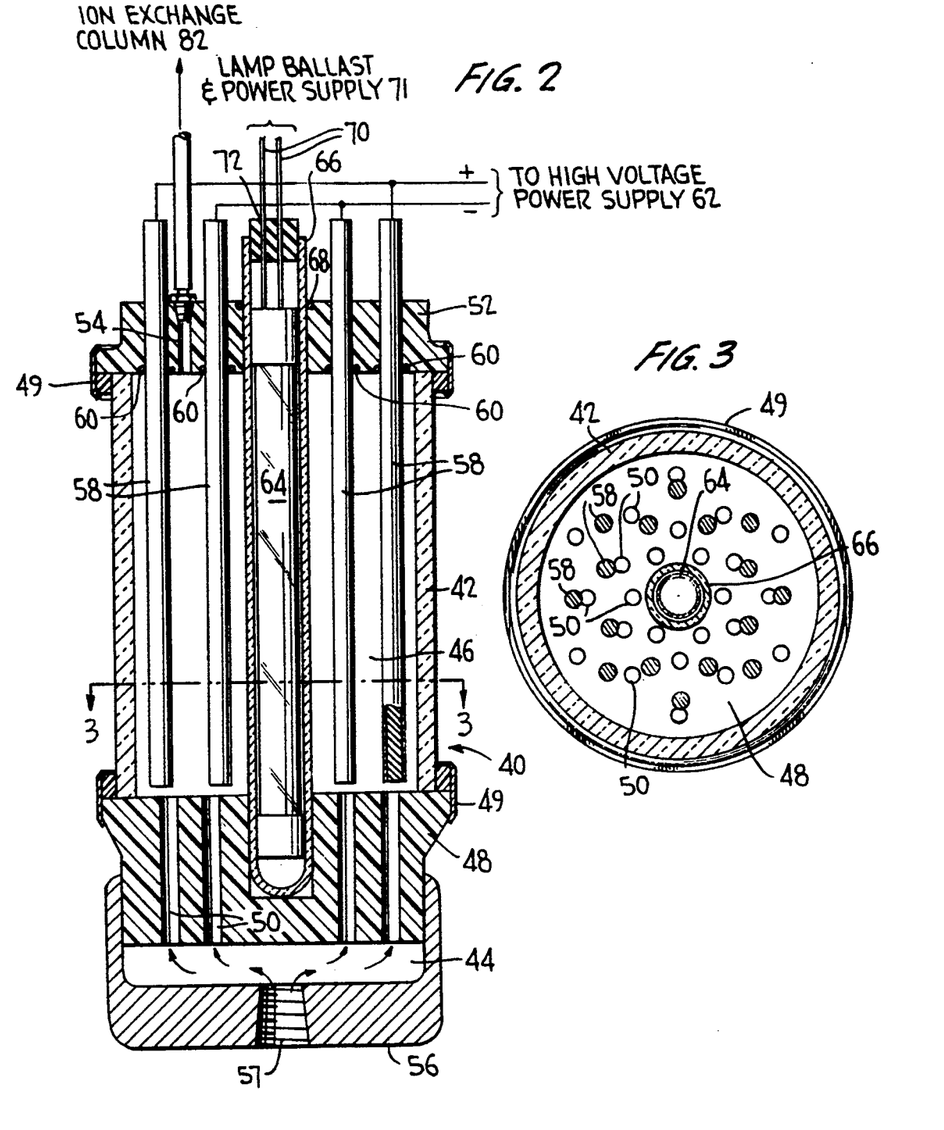
FIG. 2 is a cross-sectional view of a reactor for photocatalytic ionization and/or oxidation of organic material in a water stream according to the invention.
FIG. 3 is a cross-sectional view taken along the line 3—3 of FIG. 2.

After measurement of the TOC concentration of the UPW stream by instrument 12 at point A, the stream was supplied to reactor 40. An embodiment of reactor 40 preferred for test purposes is shown in FIGS. 2 and 3. In this embodiment, reactor 40 comprises a large-bore glass tube 42, capped at an inlet end by a manifold 48 and at an outlet end by an electrode plate 52. Manifold 48 and electrode plate 52 were machined of polytetrafluouroethylene and secured to the glass tube 42 by clamps 49. Water flowed longitudinally through tube 42, exiting through outlet channel 54 drilled in electrode plate 52 after an average residence time of 1.2 minutes.

More generally, the reactor 40 may be considered to comprise a flow chamber, the interior of which is divided into a plenum portion 44 and a reaction portion 46 by manifold 48. As shown in FIG. 2, manifold 48 was drilled to define a plurality of parallel flow channels 50 parallel to the axis of the glass tube 42. By thus providing a flow path including parallel flow streams extending from the inlet, through the reaction chamber to the outlet, the effects of less uniform flow patterns could be eliminated as a test variable. In a commercial reactor according to the invention, such attention to flow pattern might be unnecessary.

In the laboratory-scale reactor, the connection between instrument 12 at point A and the channels 50 of the manifold was provided by branching connection of a number of tubes connected by "Y" connectors. In a commercial device, a plenum chamber might be more conveniently be formed within an end cap 56 having a single inlet 57 and sealed over the end of the manifold 48, as shown. Alternatively, a flow-dividing manifold plate might be secured within a single flow chamber, dividing the interior of the chamber into a plenum portion 44 in communication with the water inlet and a reaction chamber 46 in communication with the water outlet.

As shown in FIG. 2, electrode plate 52 was drilled to receive a number of electrode rods 58 sealed to electrode plate 52 by O-rings 60. Rods 58 have surfaces comprising the desired photocatalytic material. In the successfully-tested embodiment of the invention, rods 58 were formed of solid Ti having had their surfaces oxidized to $TiO_2$ by exposure to UV in the presence of ultrapure water. Further in the successfully-tested embodiment of the invention, sixteen rods 58 arranged in concentric rings were provided. See FIG. 3, illustrating the arrangement of the rods 58. As indicated, the rods 58 in the inner ring were connected to the negative terminal of a high-voltage laboratory power supply 62 (Hewlett-Packard Model 6448B), and the rods 58 of the outer ring to its positive terminal; accordingly, when the power supply was energized, the inner ring of electrode rods formed the cathode and the outer ring the anode of an electrochemical cell, i.e., a strong electric field was established between the inner and outer rings of electrode rods 58.

As further illustrated by FIGS. 2 and 3, a UV lamp 64 emitting a significant amount of 185 nm radiation is disposed in the center of reaction chamber 46. In the successfully-tested embodiment of the invention, lamp 64 was a 10-watt "ozone-producing" lamp having a fused silica envelope, specifically, Model GPH212 T5V available from Atlantic Ultraviolet Co. As illustrated best in FIG. 3, the electrode rods 58 in the two concentric rings are staggered from one another, so that a substantial fraction of the surface of each rod is directly exposed to the UV radiation. For a further improvement in efficiency, the reaction chamber 46 might usefully be disposed within a cylindrical mirror, reflecting the UV back toward the center of the chamber 46, illuminating portions of the surfaces of rods 58 shadowed from direct irradiation. Lamp 64 fits within a closed-ended quartz tube 66 sealed to a central bore in electrode plate 52 by an O-ring 68. The power leads 70 by which lamp 64 is connected to a suitable ballast and power supply 71 (see FIG. 1) pass through close-fitting bores in a rubber stopper 72, allowing the tube 66 to be filled with dry nitrogen; oxygen and moisture in air otherwise normally filling tube 66 would absorb the 185 nm radiation.

Returning to discussion of the laboratory-scale system shown in FIG. 1, the water stream leaving the reactor 40 passes through a second resistivity meter 80 and then enters an ion exchange column 82. Ion exchange column 82 adsorbs any ionic species formed in reactor 40; more specifically, $CO_2$ generated by oxidation of organics in reactor 40 is present as carbonic acid dissociated as ions in the water stream, and is adsorbed by the resins in column 82, as are other organic acids or ionized organics not fully oxidized. In the successfully-tested embodiment of the invention, ion exchange column 82 comprised a 15 mm inside diameter by 450 mm long glass tube packed with Ionac Corp. mixed bed ion exchange resins. Valves 84 and 86 and line 88, as shown, provided a bypass path, if needed.

As noted, ion exchange column 82 adsorbs dissolved $CO_2$ and other weak acids formed by destruction of organics in the water stream during its residence in reactor 40, as well as any ionized but not oxidized organics, or other ionic residues e.g., from destruction or ionization of organic salts, amines, or sulfur compounds. Accordingly, the difference in TOC levels of the water stream before and after passage through reactor 40 is a measure of the effectiveness of ionization or destruction of organics therein. To measure the TOC of the stream exiting reactor 40, samples from the stream are supplied to a second Anatel A-100 SE TOC measurement instrument 90 at point B. The flow rate of the remainder of the stream is measured by a flowmeter 92.

Test Results

A series of tests were run to compare objectively the rate of TOC removal under various circumstances. The test results presented below refer to four separate tests. The results provided list TOC content in ppb and resistivity in megohm-cm of the water stream, at point A (in the left columns of values listed) and at point B (the right columns of values). In a first test, the lamp 64 was energized, but no photocatalyst was present. The results were as follows:

TABLE I

| POINT A | | POINT B | |
| --- | --- | --- | --- |
| TOC (ppb) | Resistivity | TOC (ppb) | Resistivity |
| 104 | 16.0 | 83.7 | 17.0 |
| 103 | 15.9 | 87.9 | 16.9 |
| 103 | 16.0 | 85.2 | 16.9 |
| 103 | 16.0 | 85.0 | 16.9 |
| 111 | 15.9 | 84.9 | 16.9 |
| 109 | 15.9 | 92.4 | 17.0 |
| | | 91.4 | 16.9 |

It can be seen from these results that simply exposing the water stream to UV from the lamp reduced the TOC by some 17.33% on average.

In interpreting the results shown in Table I, it should be appreciated that the TOC values are determined by the Anatel instruments at points A and B using the complex analytical techniques discussed in the Anatel patents incorporated by reference and discussed above, and in particular that the TOC values are not simple functions of the resistivity values listed together with the TOC values above. Furthermore, it should be understood that the Anatel instruments used to derive the TOC values reported above analyze samples of water from the stream and do not provide an instantaneous value for its TOC. For similar reasons, the "point A" samples do not correspond to the "point B" samples in the results above.

The second test involved comparison of the TOC content of the water stream before and after passage from point A to point B, but without UV exposure or the presence of a catalyst. The results are shown in Table II:

TABLE II

| POINT A | | POINT B | |
|---|---|---|---|
| TOC (ppb) | Resistivity | TOC (ppb) | Resistivity |
| 110 | 16.0 | 112 | 17.0 |
| 108 | 16.0 | 113 | 17.0 |
| 108 | 16.0 | 113 | 17.0 |
| 108 | 16.0 | 113 | 17.0 |
| 108 | 16.0 | 113 | 17.0 |
| 109 | 16.1 | 113 | 17.0 |
| 108 | 16.1 | 113 | 17.0 |
| 108 | 16.1 | 112 | 17.0 |
| 109 | 16.0 | 113 | 17.1 |
| 108 | 16.0 | 112 | 17.1 |
| 109 | 16.0 | 112 | 17.1 |
| 109 | 16.1 | 111 | 17.1 |

The results shown in Table II indicate that the TOC content of the water stream increased slightly during passage through the reactor and ion exchange resin column; presumably this increase was due to TOC leaching from the resin materials.

In a third experiment, the TiO$_2$ surfaced Ti rods 58 as above were assembled within the reaction chamber 46, and the UV lamp 64 energized. Table III lists the results:

TABLE III

| POINT A | | POINT B | |
|---|---|---|---|
| TOC (ppb) | Resistivity | TOC (ppb) | Resistivity |
| 98.6 | 16.0 | 86.5 | 16.9 |
| 102 | 16.0 | 87.1 | 16.9 |
| 103 | 16.0 | 86.7 | 17.0 |
| 102 | 16.0 | 86.9 | 16.9 |
| 103 | 16.0 | 86.7 | 17.0 |
| 104 | 16.0 | 87.1 | 17.0 |

The results given in Table III indicate clearly that the combination of short-wavelength UV radiation and a suitable photocatalyst is effective in destruction of organics in a water stream. In this case, a destruction rate averaging 14.95% was measured. This is somewhat lower that the results reported in Table I above, wherein the electrodes were not present; this somewhat surprising result is attributed to organics on the Ti rods from machining operations, and/or ionic leaching from the Ti.

The final experimental configuration included a 600 VDC potential applied as above, that is, with the inner ring of electrodes connected to the negative terminal and the outer ring to the positive terminal of a power supply. The results were as follows:

TABLE IV

| POINT A | | POINT B | |
|---|---|---|---|
| TOC (ppb) | Resistivity | TOC (ppb) | Resistivity |
| 97.9 | 15.9 | 71.9 | 16.9 |
| 97.9 | 15.8 | 73.2 | 16.9 |
| 95.2 | 15.9 | 72.7 | 16.9 |
| 96.8 | 15.9 | 72.3 | 16.9 |
| 96.6 | 16.0 | 71.3 | 16.8 |
| 98.8 | 16.0 | 69.6 | 16.9 |
| 99.6 | 16.0 | 69.8 | 16.9 |
|  |  | 72.7 | 16.9 |

The results of Table IV illustrate clearly that application of a voltage between the electrode provides a substantial increase in oxidation rate; in this case, an average destruction rate of 26.5% was observed, some 43.6% greater than the corresponding value without application of the voltage.

Figures 4, 5:
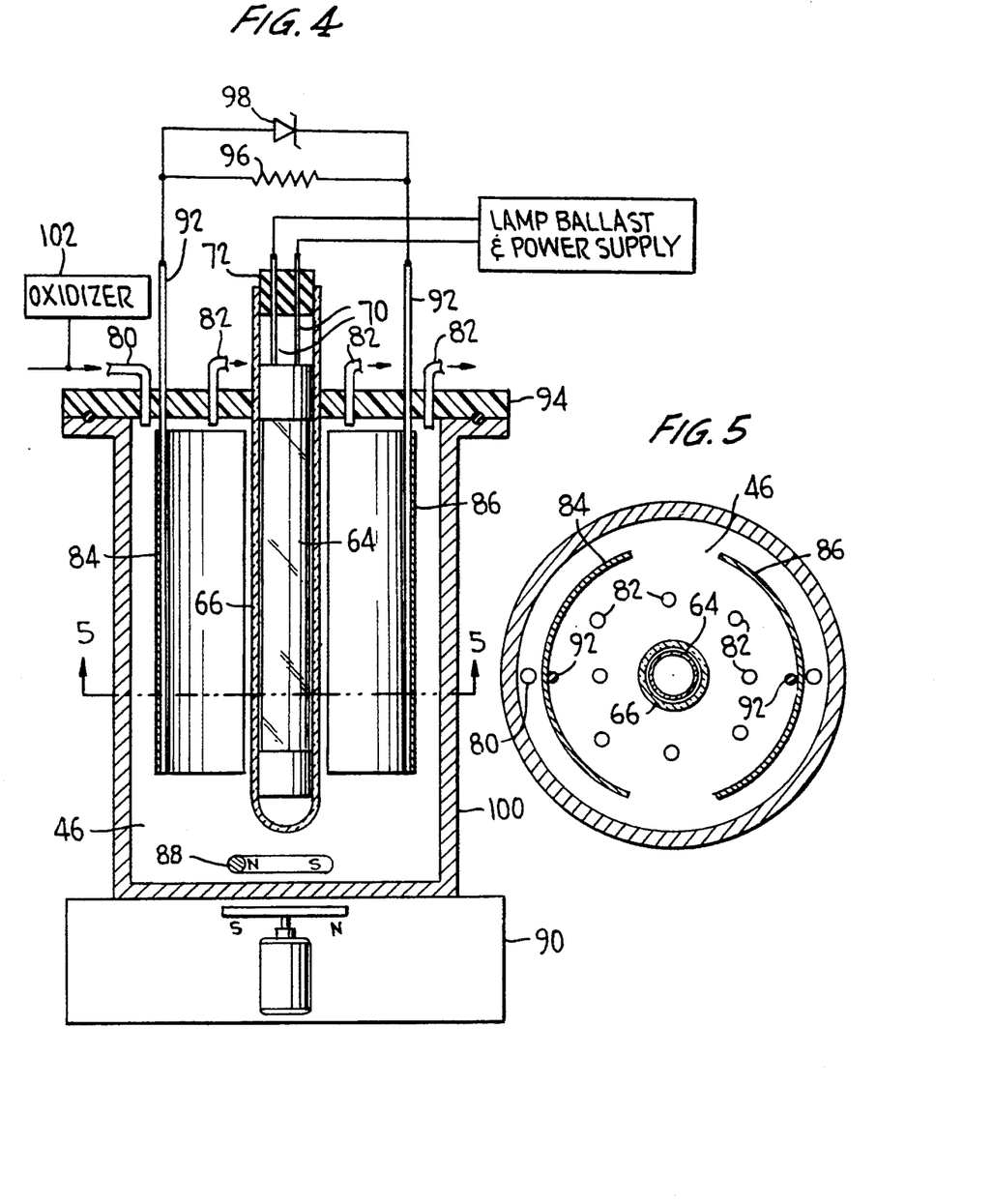
FIG. 4 is a view comparable to FIG. 2 illustrating a further embodiment of the reactor of the invention.
FIG. 5 is a cross-sectional view taken along line 5—5 of FIG. 4.

As indicated above, the embodiment of the reactor illustrated by FIGS. 2 and 3 was designed for experimentation concerning various aspects of the method and apparatus of the invention. FIGS. 4 and 5 illustrate certain further possible modifications to the invention.

In the embodiment shown in FIGS. 4 and 5, an elongated lamp 64 in a quartz tube 66 is disposed within an elongated reaction chamber 46. Water is admitted through an inlet port 80, flows through reaction chamber 46, in which organics in the water stream are oxidized and/or ionized by exposure to UV while juxtaposed to a photocatalytic surface, and exits through a plurality of exit ports 82. Water exiting reaction chamber 46 is then admitted to an ion exchange column 82 (FIG. 1), or another ion removal apparatus, for removal of CO$_2$ formed by oxidation of organics, other ionic species resulting from formation of weak acids, or other ionized organics or ionic residues.

To provide a flow path through chamber 46 ensuring relatively dispersed flow and uniform residence time of the water within the chamber 46, so as to ensure uniform oxidation and/or ionization of organics in the water stream, electrodes 84 and 86 may be formed of sheet material curved as shown to provide semicircular baffles. A conventional magnetic stirring capsule 88 and driver 90 may further be provided. Electrodes 84 and 86 may be supported within chamber 46 by rods 92; rods 92 may be conveniently sealed to chamber end cap 94, and provide convenient electrical connection to electrodes 84 and 86.

It will be appreciated that in the embodiment of the invention described above, a substantial electrical potential was applied between two electrodes or sets of electrodes having surfaces of photocatalytic material, to cause a current to flow within the solution in the reaction chamber. The current flow motivates migration of organics toward the photocatalytic surfaces, where electron "holes" created when radiation of appropriate wavelength is incident on the catalytic surface oxidize and/or ionize the organics for subsequent removal, typically by ion exchange.

According to a further aspect of the invention, organic migration may be motivated without application of an external potential per se. For example, if the surfaces of the electrodes 84 and 86 are of different materials, in most cases they will exhibit a potential difference upon exposure to radiation from lamp 64. If elements such as a resistor 96 and a diode 98 are connected between the electrodes 84 and 86 external to the cell, as shown, completing a circuit including the solution in the reactor, a current will flow through the solution. More specifically, according to the well-known "photoelectric effect", when a conductor is exposed to radiation above a characteristic energy level, electrons of corresponding energy are freed from atoms in the material, and will flow if a circuit is completed. The characteristic energy level varies from material to material. Accordingly, if two electrodes formed of materials exhibiting different characteristic energy levels are exposed to radiation, a potential difference will be exhibited across the electrodes, so that current will flow in a completed circuit.

For example, the characteristic voltage of a $TiO_2$-surfaced Ti electrode exposed to UV is 1.2 V, while the characteristic voltage of a W electrode having a $WO_3$ surface under similar circumstances is 0.6 V. Therefore, if a circuit including water between electrodes 84 and 86 made of these materials is completed by connection of a resistor 96, a current will flow even in the absence of a power supply per se. A diode 98 may optionally be provided to ensure a minimum voltage drop across resistor 96. Alternatively, a differential voltage across electrodes of similar or different materials could be provided by differential exposure of their surface to the radiation, such that a differential photoelectric effect would be obtained. A suitable potential could also be obtained between a single or commonly-connected group of electrodes and a "ground" member; for example, reaction chamber 46 could be defined by the interior of a stainless steel can 100 forming one of the electrodes. Can 100 might be provided with a semiconductive or photocatalytic interior surface, to further promote oxidation and/or ionization of the organics upon UV exposure. Further, it should be appreciated that the radiation energizing the photocatalyst need not be UV, merely that the radiation be chosen appropriately in conjunction with the material of the photocatalytic surfaces provided. As indicated above, at least one of the active electrode surfaces may be formed of a semiconductor (as opposed to a radiation-stimulated photocatalyst) such as silicon or platinum. It is further within the scope of the invention to add an oxidizer, such as $O_2$, $O_3$, or $H_2O_2$, among many others, to the incoming water stream, as indicated at 102.

While a preferred embodiment of the invention has been described in detail, the invention is not thus limited, but is limited only by the appended claims.

What is claimed is:

1. An apparatus for the oxidation and/or ionization of organic materials in an ultrapure water stream, comprising:
    a reaction chamber having an inlet and an outlet, said inlet and outlet being disposed at opposed ends of a flow path defined within said reaction chamber;
    flow controlling means in fluid communication with said inlet, for providing substantially uniformly dispersed flow of a stream of water from said inlet, through said reaction chamber along said flow path, and out through said outlet;
    one or more solid metallic members of substantially uniform cross-section having surfaces of a photocatalytic material disposed within said reaction chamber along said flow path, said photocatalytic material being effective to promote oxidation and/or ionization of organic materials in a water stream in contact with said surfaces when said surfaces are exposed to radiation of a predetermined wavelength;
    a source of radiation including radiation of said predetermined wavelength disposed so as to irradiate said surfaces of a photocatalytic material within said chamber;
    means for effectively applying an electric potential between said one or more solid members and said water stream; and
    means for completing an electric circuit including said one or more solid members and said water stream, such that an electric current flows in said water stream;
    wherein said electric potential is applied between first and second sets of said solid metallic members, such that an electric field is provided including components substantially perpendicular to the direction of flow of said water stream through said reaction chamber.

2. The apparatus of claim 1, wherein said solid members are elongated rods extending substantially between inlet and outlet ends of said chamber.

3. The apparatus of claim 1, wherein said first and second-sets of said rods are disposed in at least two concentric circles, and said electric potential is applied between rods in at least a first of said circles and rods in at least a second of said circles.

4. The apparatus of claim 1, wherein said one or more solid members are formed of a material which when oxidized forms a surface layer of a photocatalytic material.

5. The apparatus of claim 4, wherein at least one of said members is formed of Ti and has a layer of $TiO_2$ formed thereon.

6. The apparatus of claim 1, wherein said photocatalytic material is an n-type semiconductor.

7. The apparatus of claim 6, wherein said semiconductor material is selected from the group consisting of $TiO_2$, $SrTiO_3$, CdS, $WO_3$, $Fe_2O_3$, and $MO_3$.

8. The apparatus of claim 1, wherein said means for applying provides a potential of up to at least about 600 VDC.

9. The apparatus of claim 1, wherein said means for completing an electric circuit including said one or more solid members and said water stream comprises an electrically conductive member external to said reaction chamber and connected between said one or more solid members and a further conductive member exposed to said water stream.

10. The apparatus of claim 9, wherein said electrically conductive member external to said reaction chamber comprises one or both of a resistor and a diode.

11. An apparatus for the oxidation and/or ionization of organic materials in an ultrapure water stream, comprising:
    a reaction chamber having an inlet and an outlet, said inlet and outlet being disposed at opposed ends of a flow path defined within said reaction chamber;
    flow controlling means in fluid communication with said inlet, for providing substantially uniformly dispersed flow of a stream of water from said inlet, through said reaction chamber along said flow path, and out through said outlet;
    one or more solid metallic members of substantially uniform cross-section having surfaces of a photocatalytic material disposed within said reaction chamber along said flow path, said photocatalytic material being effective to promote oxidation and- /or ionization of organic materials in a water stream in contact with said surfaces when said surfaces are exposed to radiation of a predetermined wavelength;

a source of radiation including radiation of said predetermined wavelength disposed so as to irradiate said surfaces of a photocatalytic material within said chamber;

means for effectively applying an electric potential between said one or more solid members and said water stream; and means for completing an electric circuit including said one or more solid members and said water stream, such that an electric current flows in said water stream; wherein said source of radiation is an elongated lamp disposed in the center of said chamber and surrounded by a plurality of said solid members having photocatalytic surfaces exposed to said flow path.

12. The apparatus of claim 11, wherein said lamp is separated from water in said chamber by a tubular window transparent to ultraviolet radiation.

13. The apparatus of claim 11, wherein a substantial proportion of the radiation emitted by said lamp is of 185 nm wavelength.

14. An apparatus for the oxidation and/or ionization of organic materials in an ultrapure water stream, comprising:

a reaction chamber having an inlet and an outlet, said inlet and outlet being disposed at opposed ends of a flow path defined within said reaction chamber;

flow controlling means in fluid communication with said inlet, for providing substantially uniformly dispersed flow of a stream of water from said inlet, through said reaction chamber along said flow path, and out through said outlet;

one or more solid metallic members of substantially uniform cross-section having surfaces of a photocatalytic material disposed within said reaction chamber along said flow path, said photocatalytic material being effective to promote oxidation and/or ionization of organic materials in a water stream in contact with said surfaces when said surfaces are exposed to radiation of a predetermined wavelength;

a source of radiation including radiation of said predetermined wavelength disposed so as to irradiate said surfaces of a photocatalytic material within said chamber;

means for effectively applying an electric potential between said one or more solid members and said water stream;

means for completing an electric circuit including said one or more solid members and said water stream, such that an electric current flows in said water stream; and flow diffuser means for providing substantially uniform flow of water through said reaction chamber, said flow diffuser means comprising a manifold plate separating said reaction chamber into a plenum portion in flow communication with said inlet and a reactor portion containing said solid members having surfaces of a photocatalytic material, said manifold plate defining a plurality of parallel water flow passageways extending between said plenum portion and said reactor portion of said chamber.

15. The apparatus of claim 14, wherein said solid members are elongated rods extending generally parallel to said parallel water flow passageways in said manifold plate.

16. An apparatus for the oxidation and/or ionization of organic materials in an ultrapure water stream, comprising:

a reaction chamber having an inlet and an outlet, said inlet and outlet being disposed at opposed ends of a flow path defined within said reaction chamber;

flow controlling means in fluid communication with said inlet, for providing substantially uniformly dispersed flow of a stream of water from said inlet, through said reaction chamber along said flow path, and out through said outlet;

one or more solid metallic members of substantially uniform cross-section having surfaces of a photocatalytic material disposed within said reaction chamber along said flow path, said photocatalytic material being effective to promote oxidation and/or ionization of organic materials in a water stream in contact with said surfaces when said surfaces are exposed to radiation of a predetermined wavelength;

a source of radiation including radiation of said predetermined wavelength disposed so as to irradiate said surfaces of a photocatalytic material within said chamber;

means for effectively applying an electric potential between said one or more solid members and said water stream; and means for completing an electric circuit including said one or more solid members and said water stream, such that an electric current flows in said water stream;

wherein said solid members are elongated sheet-like members extending substantially between opposed ends of said chamber, and wherein said source of radiation is an elongated lamp disposed in the center of said reaction chamber and said elongated sheet-like members extending substantially between opposed ends of said chamber are curved to define substantially semi-cylindrical surfaces exposed to said water stream and generally coaxial with said lamp.

17. The apparatus of claim 16, wherein at least one of said substantially semi-cylindrical surfaces is formed of a material which promotes photocatalytic oxidation and/or ionization of organic material in said water stream when exposed to radiation from said lamp.

18. An apparatus for the oxidation and/or ionization of organic materials in an ultrapure water stream, comprising:

a reaction chamber having an inlet and an outlet, said inlet and outlet being disposed at opposed ends of a flow path defined within said reaction chamber;

flow controlling means in fluid communication with said inlet, for providing substantially uniformly dispersed flow of a stream of water from said inlet, through said reaction chamber along said flow path, and out through said outlet;

one or more solid metallic members of substantially uniform cross-section having surfaces of a photocatalytic material disposed within said reaction chamber along said flow path, said photocatalytic material being effective to promote oxidation and/or ionization of organic materials in a water stream in contact with said surfaces when said surfaces are exposed to radiation of a predetermined wavelength;

a source of radiation including radiation of said predetermined wavelength disposed so as to irradiate said surfaces of a photocatalytic material within said chamber;

means for effectively applying an electric potential between said one or more solid members and said water stream;

means for completing an electric circuit including said one or more solid members and said water stream, such that an electric current flows in said water stream; and means in fluid communication with said outlet of said reaction chamber for removal of $CO_2$, dissolved acids, and ionized organics from the water stream.

19. The combination of claim 18, wherein said means for removal of $CO_2$, dissolved acids, and ionized organics from the water stream comprises an ion exchange column.

20. In combination, means for removing $CO_2$, dissolved acids, and ionized organic species from an ultrapure water stream, and a reactor for oxidizing organics in a water stream to $CO_2$, ionizing non-oxidized organics, and forming acids from partially oxidized organics, said reactor comprising:

a reaction chamber having an inlet and an outlet, said inlet and outlet being disposed at opposed ends of a flow path defined within said reaction chamber;

flow controlling means in fluid communication with said inlet, for providing substantially uniformly dispersed flow of a stream of water from said inlet, through said reaction chamber along said flow path, and out through said outlet;

one or more solid metallic members of generally uniform cross-section and having surfaces of a photocatalytic material disposed within said reaction chamber along said flow path, said photocatalytic material being effective to promote oxidation and/or ionization of organic materials in a water stream in contact with said surfaces when said surfaces are exposed to radiation of a predetermined wavelength;

a source of radiation including radiation of said predetermined wavelength disposed so as to irradiate said surfaces of a photocatalytic material within said chamber;

means for effectively applying an electric potential between said one or more solid members and said water stream; and means for completing an electric circuit including said one or more solid members and said water stream, such that an electric current flows in said water stream.

21. The apparatus of claim 20, wherein said one or more solid members are formed of a material which when oxidized forms a surface layer of a photocatalytic material.

22. The apparatus of claim 21, wherein at least one of said members is formed of Ti and has a layer of $TiO_2$ formed thereon.

23. The apparatus of claim 20, wherein said photocatalytic material is an n-type semiconductor.

24. The apparatus of claim 23, wherein said semiconductor material is selected from the group consisting of $TiO_2$, $SrTiO_3$, $CdS$, $WO_3$, $Fe_2O_3$, and $MO_3$.

25. The apparatus of claim 20, wherein said source of radiation is an elongated lamp disposed in the center of said chamber and surrounded by a plurality of said solid members having photocatalytic surfaces in said water stream.

26. The apparatus of claim 20, wherein a substantial proportion of the radiation emitted by said source is of 185 nm wavelength.

27. The apparatus of claim 20, wherein said means for applying an electric potential between said at least one solid member and said water stream comprises means for applying a potential across paired ones of said solid metallic members, such that an electric field exists substantially perpendicular to the direction of flow of water through said reaction chamber.

* * * * *